(12) United States Patent
Oyadomari et al.

(10) Patent No.: US 7,630,385 B2
(45) Date of Patent: Dec. 8, 2009

(54) MULTIPLE DOMAINS IN A MULTI-CHASSIS SYSTEM

(76) Inventors: Randy I. Oyadomari, 3026 Rose Creek Dr., San Jose, CA (US) 95148; George A. Bullis, 147 Branch Oak Ct., Glendora, CA (US) 91741; Minh Q. Vu, 3300 Kloetzel La., San Jose, CA (US) 95148

( * ) Notice: Subject to any disclaimer, the term of this patent is extended or adjusted under 35 U.S.C. 154(b) by 300 days.

(21) Appl. No.: 11/462,669

(22) Filed: Aug. 4, 2006

(65) Prior Publication Data

US 2008/0034120 A1  Feb. 7, 2008

(51) Int. Cl.
*H04Q 11/00* (2006.01)
*H04L 12/28* (2006.01)
*G06F 15/16* (2006.01)
*G06F 11/00* (2006.01)

(52) U.S. Cl. .................. 370/400; 370/218; 370/252; 370/386; 370/466; 709/220; 709/238; 709/250; 714/11; 714/27; 714/46; 714/57

(58) Field of Classification Search ......... 370/218–285, 370/386–466; 709/220–250; 714/11, 25–27, 714/46, 57
See application file for complete search history.

(56) References Cited

U.S. PATENT DOCUMENTS

| | | | |
|---|---|---|---|
| 5,027,297 A | 6/1991 | Garitty | 364/569 |
| 5,590,116 A | 12/1996 | Zhang | 370/13 |
| 5,696,701 A | 12/1997 | Burgess | 364/999.999 |
| 5,761,424 A | 6/1998 | Adams | 395/200.47 |
| 5,812,529 A | 9/1998 | Czarnik | 370/245 |
| 5,850,386 A | 12/1998 | Anderson | 370/241 |
| 5,912,701 A | 6/1999 | Morton | 348/192 |
| 6,049,545 A | 4/2000 | Stephenson | 370/410 |
| 6,058,116 A | 5/2000 | Hiscock | 370/401 |

(Continued)

FOREIGN PATENT DOCUMENTS

EP    726664 A2    8/1996

(Continued)

OTHER PUBLICATIONS

Peter Burden, *Routing in the Internet*, Webopedia, available at http://www.scit.wlv.ac.uk/~jphb/comms/iproute.html, last visited Mar. 2, 2005, (a copy attached hereto).

(Continued)

*Primary Examiner*—Ayaz R Sheikh
*Assistant Examiner*—Venkatesh Haliyur

(57) ABSTRACT

Creation of port domains in a multi-chassis system. The multi-chassis system includes two or more chassis that each includes one or more blades. In one embodiment, a sync group of at least two chassis is created, typically by connecting the two or more chassis with an interconnection means such as a sync-cable. Then, two or more ports of the sync group are selected for inclusion in a port domain. The locations of the ports relative to each other is then determined. Finally, a port domain is generated based on the relative locations of the ports and port domain generation rules. If the ports are on separate chassis, then a global domain is generated if a predetermined number of global domains do not already exist and if the ports are on the same chassis, a local domain is generated regardless of the number of global domains.

14 Claims, 4 Drawing Sheets

U.S. PATENT DOCUMENTS

| | | | | |
|---|---|---|---|---|
| 6,098,157 | A | 8/2000 | Hsu | 711/157 |
| 6,243,834 | B1 | 6/2001 | Garrett | 714/37 |
| 6,266,789 | B1 | 7/2001 | Bucher | 714/39 |
| 6,335,931 | B1 | 1/2002 | Strong | 370/390 |
| 6,507,923 | B1 | 1/2003 | Wall | 714/712 |
| 6,636,518 | B1 | 10/2003 | Liencres | 370/395.7 |
| 6,639,957 | B2 | 10/2003 | O'Brien | 375/354 |
| 6,654,356 | B1 | 11/2003 | Eidson | 370/503 |
| 6,665,725 | B1 | 12/2003 | Dietz | 709/230 |
| 6,789,182 | B1 | 9/2004 | Brothers | 712/28 |
| 6,793,539 | B1 | 9/2004 | Lee | 439/701 |
| 6,941,482 | B2 * | 9/2005 | Strong | 713/400 |
| 7,120,725 | B2 * | 10/2006 | Sandy et al. | 710/314 |
| 7,159,017 | B2 * | 1/2007 | Oi et al. | 709/220 |
| 7,174,413 | B2 * | 2/2007 | Pettey et al. | 710/317 |
| 7,188,209 | B2 * | 3/2007 | Pettey et al. | 710/317 |
| 7,209,358 | B2 * | 4/2007 | Garnett et al. | 361/735 |
| 7,219,183 | B2 * | 5/2007 | Pettey et al. | 710/316 |
| 7,304,940 | B2 * | 12/2007 | Larsen et al. | 370/218 |
| 7,325,058 | B1 * | 1/2008 | Sheth et al. | 709/225 |
| 7,350,115 | B2 * | 3/2008 | Mathew et al. | 714/46 |
| 7,472,211 | B2 * | 12/2008 | Kawai et al. | 710/74 |
| 7,478,177 | B2 * | 1/2009 | Cherian et al. | 710/9 |
| 2002/0009079 | A1 * | 1/2002 | Jungck et al. | 370/389 |
| 2002/0105966 | A1 * | 8/2002 | Patel et al. | 370/463 |
| 2002/0152373 | A1 * | 10/2002 | Sun et al. | 713/150 |
| 2003/0093555 | A1 * | 5/2003 | Harding-Jones et al. | 709/238 |
| 2004/0236866 | A1 * | 11/2004 | Dugatkin et al. | 709/235 |
| 2004/0260842 | A1 * | 12/2004 | Pettey et al. | 710/1 |
| 2004/0268015 | A1 * | 12/2004 | Pettey et al. | 710/313 |
| 2005/0010691 | A1 * | 1/2005 | Oyadomari et al. | 709/248 |
| 2005/0025119 | A1 * | 2/2005 | Pettey et al. | 370/351 |
| 2005/0060402 | A1 * | 3/2005 | Oyadomari et al. | 709/224 |
| 2005/0060409 | A1 * | 3/2005 | Dube et al. | 709/226 |
| 2005/0060413 | A1 * | 3/2005 | Oyadomari et al. | 709/227 |
| 2005/0076107 | A1 * | 4/2005 | Goud et al. | 709/223 |
| 2005/0102437 | A1 * | 5/2005 | Pettey et al. | 710/1 |
| 2005/0147117 | A1 * | 7/2005 | Pettey et al. | 370/463 |
| 2005/0243850 | A1 * | 11/2005 | Bass et al. | 370/412 |
| 2006/0029104 | A1 * | 2/2006 | Jungck | 370/498 |
| 2006/0067506 | A1 * | 3/2006 | Flockhart et al. | 379/265.09 |
| 2006/0184711 | A1 * | 8/2006 | Pettey et al. | 710/316 |
| 2006/0198318 | A1 * | 9/2006 | Schondelmayer et al. | 370/252 |
| 2006/0198319 | A1 * | 9/2006 | Schondelmayer et al. | 370/252 |
| 2006/0200711 | A1 * | 9/2006 | Schondelmayer et al. | 714/712 |
| 2007/0005968 | A1 * | 1/2007 | Lu et al. | 713/168 |
| 2007/0183313 | A1 * | 8/2007 | Narayanan et al. | 370/216 |
| 2007/0289005 | A1 * | 12/2007 | Kumar et al. | 726/10 |
| 2008/0028107 | A1 * | 1/2008 | Cherian et al. | 710/9 |
| 2008/0126874 | A1 * | 5/2008 | Oyadomari et al. | 714/39 |

FOREIGN PATENT DOCUMENTS

| | | |
|---|---|---|
| WO | WO 01/52400 A1 | 7/2001 |
| WO | WO 2005006144 A2 * | 1/2005 |

OTHER PUBLICATIONS

Keith Schultz, *A Complete Solution, Enterasys Networks proves its mettle in enterprise-class switching*, Internetweek.Com, Jan. 22, 2001, available at http://www.internetweek.com/reviews01/rev012201.htm, (a copy attached hereto).

Web page: Marvell Press Release, *Galileo Announces New High-Performance 240-port Ethernet Switch Reference Design*, Sep. 13, 1999, (a copy attached hereto).

* cited by examiner

MULTIPLE DOMAINS IN A MULTI-CHASSIS SYSTEM

CROSS-REFERENCE TO RELATED APPLICATIONS

Not applicable.

BACKGROUND

Computer and data communications networks continue to develop and expand due to declining costs, improved performance of computer and networking equipment, and increasing demand for communication bandwidth. Communications networks, including for example, wide area networks ("WANs"), local area networks ("LANs"), and storage area networks ("SANs") allow increased productivity and utilization of distributed computers or stations through the sharing of resources, the transfer of voice and data, and the processing of voice, data, and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Gigabit Ethernet, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types has different sets of standards, referred to as protocols, which set forth the rules for accessing the network and for communicating among the resources on the network.

Typically, transmissions between two network connected devices are passed through a hierarchy of protocol layers at each of the connected devices. Each layer in the first network connected device essentially carries on a conversation with a corresponding layer in the second network connected device, in accordance with an established protocol that defines the rules of communication between the layers.

As communication networks have increased in number, size and complexity however, they have become more likely to develop a variety of problems that are increasingly difficult to diagnose and resolve. Moreover, the demands for network operational reliability and increased network capacity, for example, emphasize the need for adequate diagnostic and remedial systems, methods and devices.

Example causes of network performance problems include the transmission of unnecessarily small frames of information, inefficient or incorrect routing of information, improper network configuration and superfluous network traffic, to name just a few. Such problems are aggravated by the fact that many networks are continually changing and evolving due to growth, reconfiguration and introduction of new network typologies and protocols, as well as the use of new interconnection devices and software applications.

Consequently, as high speed data communications mature, many designs increasingly focus on reliability and performance issues. In particular, communications systems have been designed to respond to a variety of network errors and problems, thereby minimizing the occurrence of network failures and downtimes. In addition, equipment, systems and methods have been developed that allow for the testing and monitoring of the ability of a communications system to respond to and deal with specific types of error conditions on a network. In general, such equipment, systems, and methods provide the ability to selectively alter channel data, including the introduction of errors into channel data paths.

One device that is used to detect these errors is a protocol analyzer, also called a network analyzer. A protocol analyzer runs in the background of a network, capturing, examining and logging packet traffic. Protocol analyzers can, for example, be configured to watch for unusual IP addresses, time stamps and data packets, and most have a user interface for enabling the network administrator to have access to information representing the analysis performed by the protocol analyzers. Protocol analyzers are thus a fundamental and highly useful tool for testing and debugging various types of communications networks, including computing and computer storage networks. A protocol analyzer operates by capturing selected portions of data from a data stream that is transmitted via the communications network. The captured information may then be analyzed in greater detail by the protocol analyzer to extract desired information. For instance, data transmission faults or errors, or performance errors, known generally as problem conditions, may be diagnosed by examining the captured data that is related to the problem. Hacking can also be detected through a protocol analyzer.

Protocol analyzers can be transparent to a network(s) or be configured as gateways or switching networks. Regardless, they include ports (physical connections) to the networks. The ports provide connectivity to the networks and permit the protocol analyzers to receive and capture network data. The ports are often provided on a blade (or card) that is often contained in a chassis (or box) with a common backplane or bus. The chassis may be modular, thereby allowing multiple chassis to be mounted to a rack in a customizable and expandable system. Such multi-chassis protocol analyzer systems provide access to a large number of ports over numerous blades that can be used for various purposes.

As networks have become more complex and sophisticated, protocol analyzers with increasing numbers of ports have been developed, enabling the protocol analyzers to be configured for use with different data links or channels. It is often desirable to associate some of these ports into a single logical grouping or domain for coordinated activity. The increasing numbers of ports, however, also increases the complexity of protocol analyzers and presents the problem of coordinating among ports to capture network data in a way that enables the time sequence of the data transmitted in multiple channels or data links to be accurately represented.

BRIEF SUMMARY

Embodiments disclosed herein relate to methods for creating port domains for two or more ports in a multi-chassis system. The multi-chassis system includes two or more chassis that each includes one or more blades. The one or more blades in turn include one or more ports. The two or more chassis may be interconnected through use of an interconnection means. The multi-chassis system may also include access to one or more microprocessors that may execute thereon software that causes the two or more chassis generate port domains.

In one embodiment, a sync group of at least two chassis is created. Then, two or more ports of the sync group are selected for inclusion in a port domain. The locations of the two or more ports relative to each other is then determined. Finally, a port domain is generated based on the relative locations of the two or more ports and port domain generation rules.

In an alternative embodiment, it is determined that a predetermined number of global port domains have been generated for the multi-chassis system. A request is then received to generate an additional port domain above the predetermined number of global port domains that have previously been generated. In response to the request, a local port domain comprising two or more ports located on the same chassis is generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
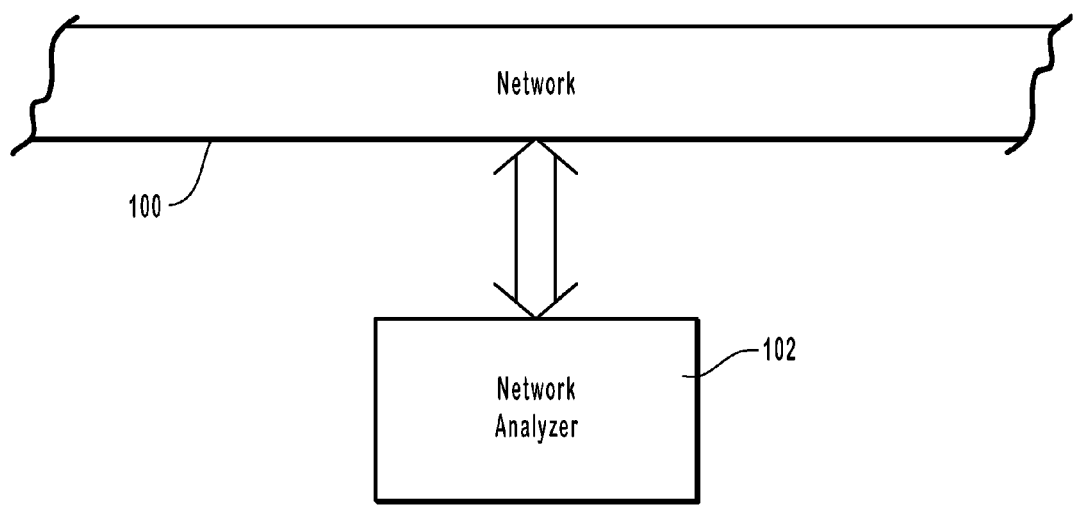
FIG. 1 is a schematic diagram that illustrates the relation of a protocol analyzer with respect to a computer network according to embodiments disclosed herein.

Embodiments disclosed herein relate to methods for creating port domains for two or more ports in a multi-chassis system. The multi-chassis system includes two or more chassis that each includes one or more blades. The one or more blades in turn include one or more ports. The two or more chassis may be interconnected through use of an interconnection means. The multi-chassis system may also include access to one or more microprocessors that may execute thereon software that causes the two or more chassis generate port domains.

In one embodiment, a sync group of at least two chassis is created, typically by connecting the two or more chassis with an interconnection means such as a sync-cable. Then, two or more ports of the sync group are selected for inclusion in a port domain. The two or more ports may be on separate chassis or they may be on the same chassis. The locations of the two or more ports relative to each other is then determined. Finally, a port domain is generated based on the relative locations of the two or more ports and port domain generation rules.

For example, if the two or more ports are located on separate chassis, then a global or inter-chassis port domain will be generated as long as a predetermined number of global domains have not previously been generated. On the other hand, if the two or more ports are located on the same chassis, then a local domain will be generated regardless of the number of global domains that may already exist.

In an alternative embodiment, it is determined that a predetermined number of global port domains have been generated for the multi-chassis system. A request is then received to generate an additional port domain above the predetermined number of global port domains that have previously been generated. In response to the request, a local port domain comprising two or more ports located on the same chassis is generated. Accordingly, the embodiments disclosed herein allow for any number of local port domains to be generated in combination with a predetermined number of global or inter-chassis domains.

As a practical matter, the embodiments disclosed herein are often tied to a particular hardware implementation. The particular hardware configuration discussed herein, however, is for illustrative purposes and the embodiments disclosed herein are not necessarily limited to any specific hardware configuration. Various embodiments of may comprise a special purpose or general-purpose computer including various computer hardware, as discussed in greater detail below.

As used herein, the terms "protocol analyzer" and "network analyzer" are used interchangeably and relate to devices having hardware or software for performing network troubleshooting, monitoring, network data analysis, network performance analysis, diagnosis, traffic simulation, bit error rate testing, network jamming, or other procedures that are conventionally performed by protocol analyzers or network analyzers. Protocol analyzers and network analyzers represent examples of special-purpose computers that can perform the operations associated with the methods described herein.

Embodiments also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

Reference will now be made to the drawings to describe various aspects of the embodiments of the invention. It is to be understood that the drawings are diagrammatic and schematic representations of such embodiments, and are not limiting of the present invention, nor are they necessarily drawn to scale.

In the following description, numerous specific details are set forth in order to provide a thorough understanding of the present invention. It will be obvious, however, to one skilled in the art after having read this description that the present invention may be practiced without these specific details. In other instances, well-known aspects of network systems have not been described in particular detail in order to avoid unnecessarily obscuring the present invention.

Reference is first made to FIG. 1, which shows a simplified view of a portion of a communications network, generally designated at 100. The communications network 100 may comprise, for illustrative purposes, a portion of a wide area network (WAN), a local area network (LAN), a storage area network (SAN), or other networks known in the art. The communications network 100 includes various components that communicate with one another via the network, including for example, computers, servers, and mass storage devices. Transmitted data exchanged between these components and others known in the art is referred to herein as communications traffic or network traffic. The communications traffic is transmitted via network components by processes well known in the art. The data contained in the communications traffic can comprise both physical protocols, which characterize the nature or formatting of the data, and logical protocols that include the content of the data itself.

As seen in FIG. 1, a network analyzer 102 is disposed in relation to the communications network 100 so as to be able to monitor communications traffic on the communications network 100. It is appreciated, however, that the network analyzer can be interconnected with the communications network 100 in any one of a variety of configurations, and thus is not limited to the particular configuration shown in FIG. 1. For example, the network analyzer may analyze communications traffic between any two nodes of the network, such as between a server and a computer terminal or a mass storage device. As explained herein, the network analyzer 102 may be employed to detect and debug erroneous or aberrant data communications that are included in the communications traffic. The network analyzer 102 may be configured to operate transparently to network 100. Alternatively, the network analyzer 102 can serve as part of a gateway to various devices in or portions of the network.

Figure 2:
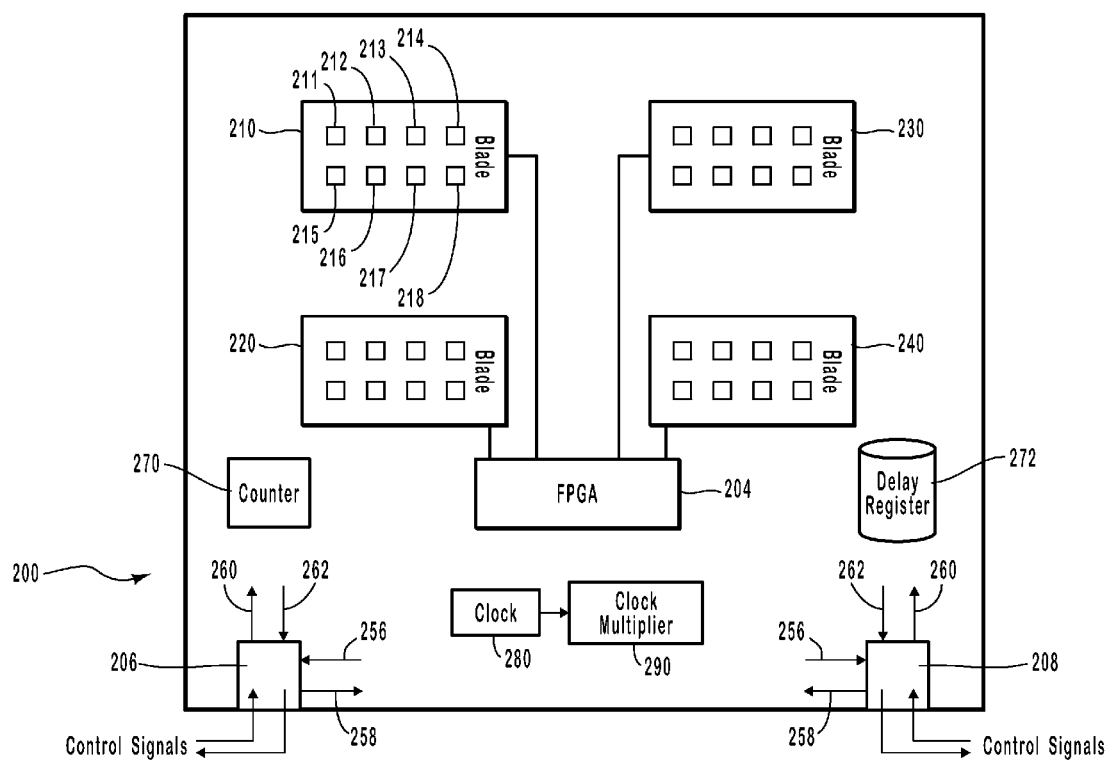
FIG. 2 is a diagram representing a chassis according to embodiments disclosed herein.

Referring now to FIG. 2, FIG. 2 is a block diagram that illustrates a protocol analyzer chassis 200. Generally, a chassis is the physical frame or structure of a computer system or other multi-component device. The protocol analyzer chassis 200 includes four blades, illustrated as blades 210, 220, 230, and 240. A blade is a thin, energy and cost-efficient electronic circuit board that is designed to be plugged or positioned in a chassis with other blades like a book in a library shelf. Such modular electronic circuit boards may contain one, two, or more microprocessors and memory and usually has an operating system and the application program to which it is dedicated. Alternatively, the modular electronic circuit boards may contain logic devices such as application-specific integrated circuits (ASICs) or field programmable gate arrays (FPGAs) that provide, or can be programmed to provide, a desired function, such as a protocol analyzer. According to embodiments of the invention, each blade may include one or more network analyzers thereon, examples of which are provided below.

The chassis 200 further includes, by way of example, a motherboard (not depicted) capable of running software and also capable of communicating with each of the blades. The motherboard has a connection to a network to allow communication with other systems on the network, such as other chassis, and also a client system which is used to configure and control each chassis.

Blade 210 includes ports 211, 212, 213, 214, 215, 216, 217, and 218. A port is generally a specific place on a networked device for being physically connected to some other device, usually with a socket and plug of some kind. It will be understood that when ports are referred to herein that additional software and/or hardware, such as analyzer modules and capture buffers, are in communication with the port to affect the desired network analysis and data capture. Thus, the ports 211, 212, 213, 214, 215, 216, 217, and 218 physically connect to the transmission medium of the network and can be used to assist other devices in monitoring network traffic and capturing data of interest. It is the need to have ports that can operate in conjunction with other ports that has led to the development of chassis, such as chassis 200 that support a certain number of blades which in turn support a certain number of ports. Protocol analyzer 200 thus has multiple ports, analyzers, and capture buffers that can be used to collectively capture and analyze data that is transmitted on different data links in a network, such as network 100, or in different channels in the network.

Each blade supports a plurality of ports, such as two, four, eight or any number of additional ports. The blade 210, for example, includes or supports the ports 211, 212, 213, 214, 215, 216, 217, and 218. The other blades 220, 230, and 240 of protocol analyzer chassis 200 similarly include or support a number of ports (as well as capture buffers and analyzer modules). The ports may be either unidirectional or bi-directional ports. Additionally as described in greater detail below, each port is preferably configured to be within a domain, or logical group of one or more ports that operate collectively.

As previously mentioned, connected to each port 211, 212, 213, 214, 215, 216, 217, and 218, are capture buffers and analyzer modules. The protocol analyzer 200 is thereby configured to enable the capture of desired data contained in the traffic of a communications network. The capture of the data may be triggered by one of the analyzer modules detecting a selected datum or event in the communications traffic, such as one or more statistical characteristics of that data.

Ports and the associated analyzer module and capture buffers perform both filtering and triggering operations. In particular, the filter operation looks for a certain type of data that it wants to capture, such as certain types of packets. In some embodiments it may look for all packets, packets that contain a certain piece of information, a certain type of packet from a certain port to another port, an error, statistical information, or other network data of interest. The filter passes all types of traffic that are not currently of interest to the analyzer while storing in a capture buffer or capturing data that is of interest.

Triggering operations generally include stopping the capture of data so that a static collection of data in the capture buffers is maintained. A trigger may be generated if selected data of interest is identified, for example, or if a capture buffer that has data stored by filtering operations becomes filled. The trigger operation may direct each port in a domain to stop immediately or to capture data for a period of time and then stop so that the capture buffer contains network data from before and after the network data of interest was identified. The trigger command is generated at a single port and then communicated to each port in the domain via a serial protocol for coordinated action.

The protocol analyzer chassis 200 further includes, by way of example, a field programmable gate array (FPGA) 204 or other similar module. The FPGA 204 is an integrated circuit incorporating an array of programmable logic gates that are not pre-connected but where the connections are programmed electrically by the network administrator. The FPGA 204 can be used, for example, to direct various signals to various ports. The FPGA 204 is also used to program each port to a particular domain and to set the correct bits from the control signals to the appropriate port. The FPGA 204 can be programmed via another port from a processor, for example. The FPGA 204 can also coordinate the transitions between Discovery Mode and Normal Mode as well as coordinate the operation of each.

The protocol analyzer chassis 200 further includes inter-chassis communication devices, such as cable receptacles 206, 208, which are each adapted to receive a network cable, or "sync-cable," one in an upstream direction and one in a downstream direction. The cable receptacles 206, 208 may comprise, for example, RJ-45 jacks. Each cable carries control signals between adjacent chassis in a serial connection as described herein. Example control signals include, but are not limited to, a data in signal 260, a data out signal 262, a clock in signal 258, and a clock out signal 256. The data in signal 260 and data out signal 262 may further include various component signals, for example, a run signal, a stop signal, a trigger signal, and a chassis discovery signal. Although the data in signal 260 and data out signal 262 are communicated via chassis to chassis communication, the data signals are particular to specific domains. In addition, it will be understood by those skilled in the art that the use of cable receptacles 206, 208 and accompanying cables can be replaced by wireless communications devices.

Each port can generate a trigger signal, which indicates that a trigger event or condition has occurred. After the trigger signal is generated, it is transmitted to each port in the domain across the connected chassis so that each port will respond as desired, typically capturing a specified range of communications for analysis, as previously mentioned.

Figure 3:
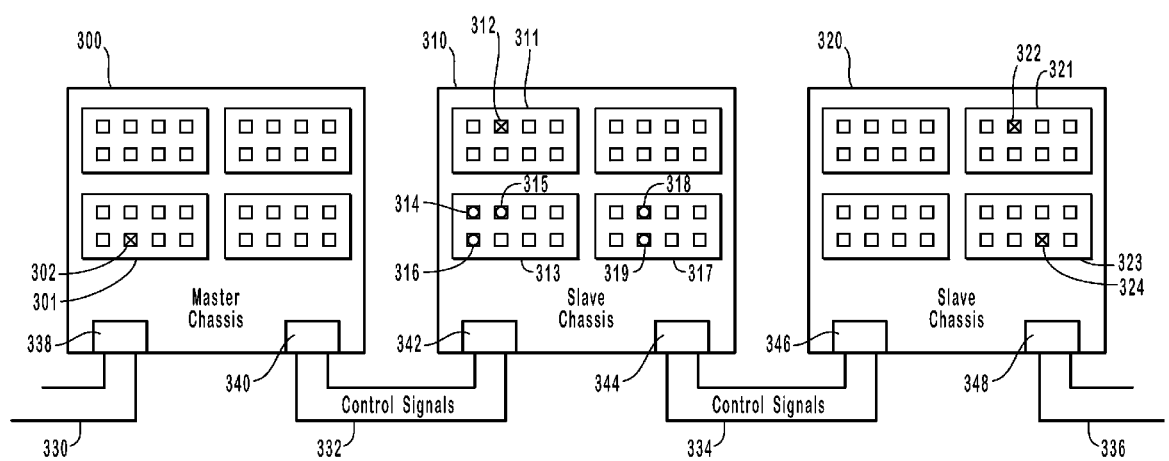
FIG. 3 is a diagram representing a multi-chassis system according to embodiments disclosed herein.

Protocol analyzer chassis 200 may include an oscillator or clock 280 that operates at a certain frequency (such as 50 MHz) to generate a clock signal that is propagated to the other protocol analyzer chassis in the chain. Because the ports can often support a high data rate, the clock signal of the clock 280 is multiplied by the clock multiplier 290 and the resulting clock signal of the clock multiplier is used to drive time stamp counters of each port of each blade within the chassis. Each time stamp counter of each port is thus driven by the multiplied clock signal generated by the clock multiplier 290. The clock signals are transmitted as a clock out signal 256 and a clock in signal 258. The clock out signal 256, for example, is typically generated by a master chassis and is sent to one or more slave chassis (as shown in FIG. 3). The clock in signal 258 may be used to run the counter 280. The clock in signal 258 may refer to the clock signal that is received from a previous master or slave chassis (shown in FIG. 3). The master chassis sends the clock to the first slave chassis, which in turn receives the clock and passes it on to the next slave chassis, if any, and so forth.

In various embodiments it may be preferable to have different clocks operating for chassis-to-chassis communication and for port-to-port communication. For example, the master chassis can generate a 50 MHz clock signal that will be used by all chassis for chassis-to-chassis communication. A 100 MHz timestamp clock may in turn be generated for the port-to-port communication.

Each chassis may be isolated or serially connected to other chassis via the sync-cables, which are one form of a chassis interconnection means. Accordingly, FIG. 3 is a block diagram that illustrates a series of chassis that are connected by sync-cables 330, 332, 334, 336 in a particular topology. In one example, the sync-cables may connect to each chassis using RJ-45 connectors which connect with RJ-45 jacks 338, 340, 342, 344, 346, 348 in each chassis. The sync-cables carry the control signals from one chassis to the next. For example, the chassis 300 is connected with the chassis 310 by the cable 332 and the chassis 310 is connected to the chassis 320 by the cable 334. Sync-cables 330 and 336 illustrate that the chassis chain may be extended in either direction. The chassis 300, 310 and 320 are not required to be co-located. Software can be used to detect any illegal connection, such as braches or loops in the chassis topology.

Referring again to FIG. 2, each chassis includes a delay register 272 that can be programmed with the transmission latency between the various chassis in a chain. The delay register itself may reside in the FPGA 204, or it may be implemented in hardware external to the FPGA. These latencies are predictable and can therefore be experimentally determined and stored in the delay register. The delay register 272 is then referred to each time an incoming or outgoing control signal indicates that a selected activity should be performed. The delay register informs the chassis how long it should delay before implementing the activity so that each chassis can synchronously perform the selected activity rather than at delays corresponding to transmission latencies. In some cases it may be desirable to delay only certain signals using the delay register, while other signals are acted upon immediately after being received.

Each group of connected chassis can be configured as one or more than one sync-group. During normal operation, the most upstream chassis in a sync-group is designated as a master and has nothing connected to its upstream incoming cable receptacle (unless there is an upstream sync-group). Downstream chassis in a sync-group are designated to be slaves.

If the chain is logically broken into multiple chains, or sync-groups, no communication takes place between the sync-groups. This is accomplished via a control register in each chassis that specifies whether incoming information is to be ignored from either the upstream or downstream chassis. The most upstream chassis (which should be a master, otherwise it cannot be used), should be configured to ignore any information from its upstream side. Likewise, the most downstream chassis in a sync-group should be configured to ignore any information from its downstream side. Each master chassis, whether it is the most upstream chassis or not, is configured to ignore any information from its upstream side. This guarantees that each sync-group is isolated from each other and that any chains that are in Normal Mode are not interfered with should additional chassis be added to the beginning or end of a chain.

As illustrated by example in FIGS. 2 and 3, an illustrative chassis can support up to four blades and each blade can support up to eight ports. As noted earlier, however, the individual chassis may support any number of blades that include any number of ports. A "port domain" refers to a group of ports in a sync group that are bundled or logically connected together, and generally represents the number of simultaneous users that may use different ports within the sync group. The domains generally include at least two ports as a connection of two ports is the smallest meaningful combination. There are typically two types of domains, global domains and local domains. Because the chassis or blades are not necessarily of the same technology, it is possible to have different types of ports within a single domain.

In this description and in the claims, a "global port domain" or an "inter-chassis port domain" is defined to mean a port domain that comprises at least two ports located on separate chassis. The global port domain may also include any number of additional ports that may be located on the same chassis or different chassis as the at least two ports located on separate chassis. For example, in the illustrative system of FIG. 3 where a sync group includes 96 ports distributed over three chassis, a global port domain may comprise a port domain of two ports located on separate chassis, a port domain including all 96 ports connected as 48 port pairs, or a port domain comprising any combination in between these two extremes.

Referring again to FIG. 3, depicted is a global port domain illustrated by an "x" through the ports of the global domain. The global port domain illustrated in FIG. 3 includes the port 302 from a blade 301 of the chassis 300, a port 312 from a blade 311 of the chassis 310, a port 322 from the blade 321 of the chassis 320, and a port 324 from a blade 323 of the chassis 320. The global domain illustrated by FIG. 3 thus shares ports that are located on different blades of different chassis.

On the other hand, a "local port domain" is defined in this description and in the claims to mean a port domain that comprises ports that are located exclusively on the same chassis. The local domain may include any number of additional ports as long as all the ports of the local port domain are located on the same chassis. For example, in the illustrative system of FIG. 3 where each chassis includes four blades that support up to eight ports each, a local domain may comprise a port domain of two ports located on the same chassis, a port domain comprising all 32 ports on the same chassis, or a port domain comprising any combination in between these two extremes. Since local port domains exist only within a single chassis, they require no bandwidth or resources from the inter-chassis connection means, which may take the form of sync-cables.

Referring again to FIG. 3, a local port domain is also illustrated by the use of "o" through the ports of the domain. The local port domain illustrated in FIG. 3 includes ports 314, 315, and 316 from a blade 313 of the chassis 310 and ports 318 and 319 of a blade 317 also of the chassis 310. The local domain illustrated by FIG. 3 thus shares ports that are located on different blades of the same chassis.

In many applications, it is often useful to create multiple domains in a single sync group. This allows for a large number of users to simultaneously use the different ports of the sync group. However, in some multi-chassis analyzer systems, the number of domains that may be supported in each sync group has been limited to a predetermined number, for example eight total domains, due to hardware and software limitations. This predetermined number of total domains includes both global and local domains. In such cases, a group of users who desire to create a port domain after the predetermined number of port domains has been created are not allowed to create a new port domain. This is true even if the multi-chassis system includes two or more ports that have not been included in one of the existing port domains. The embodiments disclosed herein relate to systems and methods for configuring a protocol analyzer to generate any number of local port domains regardless of the total number of port domains already existing.

Figure 4:
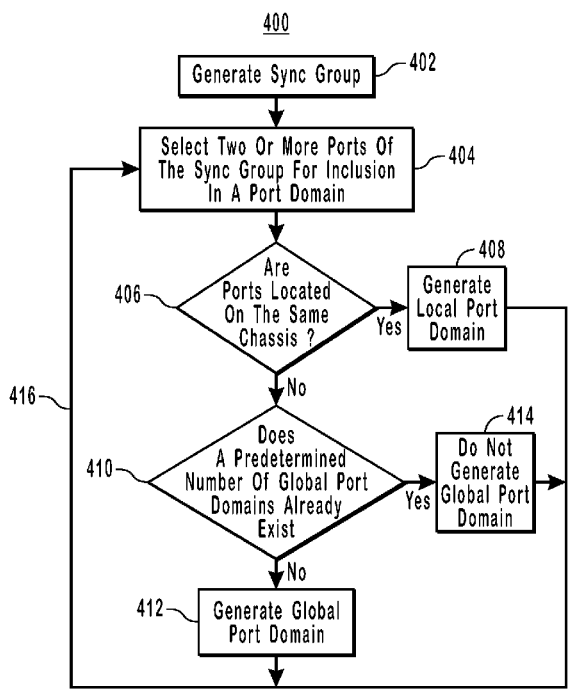
FIG. 4 illustrates a method for generating domains in a multi-chassis system according to embodiments disclosed herein.

One example method 400 for configuring port domains is illustrated in FIG. 4. The method 400 will be described with respect to the environment previously described in relation to FIG. 3, although this not required. It will be appreciated that the method 400 may be practiced in any reasonable multi-chassis analyzer system. It will also be appreciated by one skilled in the art after having read this description that software may configure one or more microprocessors included in the various blades of the multi-chassis system or a microprocessor of the client system coupled to the various chassis to perform the acts of method 400.

Method 400 initially includes an act of generating a sync group of at least two chassis (act 402). For example, a sync group including chassis 300, 310 and 320 may be generated in the manner previously described. This act may be performed well in advance of the remaining acts.

Method 400 also includes an act of selecting two or more ports of the sync group for inclusion in a port domain (act 404). For example a microprocessor or other device may select ports 301, 312, 322, and 324 for inclusion in a port domain. Alternatively, the microprocessor or other device may select ports 314, 315, 316, 318, and 319 for inclusion in a port domain. Of course, other ports of the multi-chassis system may also be selected for inclusion in a port domain as well.

The method 400 next determines the location of the two or more selected ports relative to each other. For example, in decision block 406, it is determined if the two or more ports are located on the same chassis. If the two or more ports are located on the same chassis (Yes in decision block 406) then a local port domain is generated (act 408). For instance, if ports 314, 315, 316, 318, and 319 were selected for inclusion in a port domain, then a local port domain would be generated during act 408. It is important to note that the local port domain will always be created regardless of the number of port domains already generated provided that there are at least two ports on a single chassis not configured in a pre-existing port domain. In other words, the generation of the local domains is independent of any predetermined number of port domains.

However, if the two or more ports are not on the same chassis (No in decision block 406), then it is determined if a predetermined number of inter-chassis or global port domains in the sync group already exist (decision block 410). For instance, if ports 301, 312, 322, and 324 were selected for inclusion in a port domain, then it would be determined if the predetermined number of global port domains already existed. In one embodiment, the predetermined number of global port domains is eight.

If the predetermined number of inter-chassis or global domains did not already exist (No in decision block 410), then a global port domain would be generated (act 412). For instance, if ports 301, 312, 322, and 324 were selected for inclusion in a port domain, then a global port domain would be generated during act 412.

However, if the predetermined number of inter-chassis or global domains did already exist (Yes in decision block 410), then a global or inter-chassis port domain would not be generated (act 414). Thus, the number of inter-chassis or global domains is dependent on the number of predetermined global domains. However, as mentioned previously, the predetermined number of global domains will not affect the number of local domains that may be generated.

Referring again FIG. 4, a line 416 is used to illustrate that the acts of method 400 after the creation of the sync group may be repeated as often as necessary. For example, an additional set of two or more ports other than those already described may be selected for inclusion into an additional local or global port domain after ports 301, 312, 322, and 324 are configured in a global port domain and/or after ports 314, 315, 316, 318, and 319 are configured in a local port domain. In some embodiments, the process may be repeated for a set of ports when a global domain may not be generated until such a time that the number of global port domains drops below the predetermined number, at which time the ports may be configured into a global domain.

Figure 5:
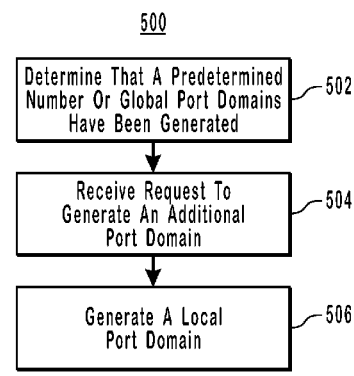
FIG. 5 illustrates an additional method for generating domains in a multi-chassis system according to embodiments disclosed herein.

Referring now to FIG. 5, an alternative method 500 for creating port domains of two or more ports is depicted. Method 500 will be described in relation to the FIG. 3. However, method 500 is not limited to such environments. It will be appreciated by one skilled in the art after having read this description that software may configure one or more microprocessors included in the various blades of the multi-chassis system or a microprocessor of the client system coupled to the various chassis to perform the acts of method 500.

Method 500 includes an act of determining that a predetermined number of global port domains have been generated for the multi-chassis system (act 502). As mentioned previously, in many systems the number of global port domains that may be created is limited to eight.

Method 500 also includes, after the act of determining, an act of receiving a request to generate an additional port domain above the predetermined number of global port domains that already have been generated (act 504). For example, a user or group of users may select ports 314, 315, 316, 318, and 319 for inclusion in a local port domain after the predetermined number of global domains, which may be eight in some embodiments, already exists.

Method 500 further includes in response to the request, an act of generating a local port domain comprising two or more ports located on the same chassis of the multi-chassis system (act 506). For example, a local port domain including ports 314, 315, 316, 318, and 319 may be generated even though the predetermined number of global port domains already exists. Thus, there may any number of local port domains created regardless of the number of global port domains already generated.

In some embodiments, this process may be repeated as necessary to generate additional local port domains after the predetermined number of global port domains has been generated. For example, a second request may be received to generate a second additional port domain above the predetermined number of global port domains that already have been generated. In response to the second request, a second local port domain comprising a second set of two or more ports located on the same chassis of the multi-chassis system may be generated.

It will be understood that other actions and methods disclosed herein but not specifically identified in FIGS. 4 and 5 are also within the scope of the invention and may be combined with the above described methods.

Related inventions in which the protocol analyzer chassis are operated in a "Discovery Mode" to discover and configure multiple ports over one or more chassis into respective domains and sync-groups are described in U.S. patent application Ser. No. 10/868,631 entitled "Discovery and Self-Organization of Topology in Multi-Chassis Systems," filed Jun. 14, 2004 and claiming the benefit of Provisional Application No. 60/479,735; both of which are incorporated herein by reference. Other related embodiments in which the configured sync-groups are operated in the "Normal Mode" by which a serial protocol is used to transmit run, stop, and trigger data between serially connected network protocol chassis to effect coordinated triggering to capture network data of interest are described in U.S. patent application Ser. No. 10/881,620 entitled "Propagation of Signals Between Devices for Triggering Capture of Network Data" filed Jun. 30, 2004 and claiming the benefit of Provisional Application No. 60/484,208; both of which are incorporated herein by reference. Further related embodiments in which the configured sync-groups are enabled to synchronize time-stamps and data capture across a multi-chassis system are described in U.S. patent application Ser. No. 10/882,711 entitled "Synchronization of Timestamps to Compensate for Communication Latency Between Devices " filed Jun. 30, 2004 and claiming the benefit of Provisional Application No. 60/483, 993; both of which are incorporated herein by reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system including two or more chassis in a multi-chassis system, wherein each chassis includes one or more blades and each blade includes one or more ports, a method for creating port domains of two or more of the ports, the method comprising:
    an act of generating a sync group of at least two chassis;
    an act of selecting two or more ports of the sync group for inclusion in a port domain;
    an act of determining the locations of the two or more ports relative to each other; and
    an act of generating the port domain dependent on the relative locations of the two or more ports and based on port domain generation rules, wherein:
        the act of determining the relative locations of the two or more ports comprises an act of determining that the two or more ports are located on the same chassis of the at least two chassis, and
        the act of generating the port domain comprises an act of generating a local port domain when the two or more ports are located on the same chassis regardless of the total number of port domains that already exist in the sync group.

2. The method in accordance with claim 1, wherein the act of determining the relative locations of the two or more ports comprises an act of determining that the two or more ports are located on different chassis in the at least two chassis.

3. The method in accordance with claim 2, wherein the act of generating the port domain comprises an act of generating an inter-chassis port domain when the two or more ports are located on different chassis provided that a predetermined number of inter-chassis port domains in the sync group do not already exist.

4. The method in accordance with claim 3, wherein the predetermined number of inter-chassis port domains in the sync group equals eight (8).

5. The method in accordance with claim 3, wherein an inter-chassis port domain is not generated if the predetermined number of inter-chassis port domains of the sync group already exist.

6. The method in accordance with claim 1, wherein the generated port domain allows for triggering and timestamping across the two or more chassis of the multi-chassis system.

7. In a system including two or more chassis in a multi-chassis system, wherein each chassis includes one or more blades and each blade includes one or more ports, a method for creating port domains of two or more of the ports, the method comprising:
- an act of determining that a predetermined number of global port domains have been generated for the multi-chassis system;
- after the act of determining, an act of receiving a request to generate an additional port domain above the predetermined number of global port domains that already have been generated;
- in response to the request, an act of generating a local port domain comprising two or more ports located on the same chassis of the multi-chassis system, wherein the request is a first request, the additional port domain is a first additional port domain and the two or more ports are a first set of two or more ports;
- an act of receiving a second request to generate a second additional port domain above the predetermined number of global port domains that already have been generated; and
- in response to the second request, an act of generating a second local port domain comprising a second set of two or more ports located on the same chassis of the multi-chassis system, wherein the number of local port domains that may be generated is independent of the predetermined number of global port domains.

8. The method in accordance with claim 7, wherein the predetermined number of global domains is eight (8).

9. A network analyzer comprising:
- a first chassis;
- a second chassis; wherein the first and second chassis each include one or more blades and each blade includes one or more ports;
- a connection means coupled to the first and second chassis for interconnecting the first and second chassis such that the first and second chassis are configured to form a sync group; and
- a microprocessor accessible by the first and second chassis, wherein executing software causes the microprocessor to perform the following;
  - an act of selecting two or more ports of the sync group for inclusion in a port domain;
  - an act of determining the locations of the two or more ports relative to each other; and
  - an act of generating the port domain dependent on the relative locations of the two or more ports and based on port domain generation rules, wherein:
    - the act of determining the relative locations of the two or more ports comprises an act of determining that the two or more ports are located on the same chassis of the at least two chassis; and
    - the act of generating the port domain comprises an act of generating a local port domain when the two or more ports are located on the same chassis regardless of the total number of port domains that already exist in the sync group.

10. The network analyzer in accordance with claim 9, wherein the act of determining the relative locations of the two or more ports comprises an act of determining that the two or more ports are located on different chassis of the at least two chassis.

11. The network analyzer in accordance with claim 10, wherein the act of generating the port domain comprises an act of generating an inter-chassis port domain when the two or more ports are located on different chassis provided that a predetermined number of inter-chassis port domains in the sync group do not already exist.

12. The network analyzer in accordance with claim 11, wherein the predetermined number of inter-chassis port domains in the sync group equals eight (8).

13. The network analyzer in accordance with claim 11, wherein an inter-chassis port domain is not generated if the predetermined number of inter-chassis port domains in the sync group already exist.

14. The network analyzer in accordance with claim 9, wherein the generated port domain allows for triggering and time stamping across the two or more chassis of the multi-chassis system.

* * * * *

UNITED STATES PATENT AND TRADEMARK OFFICE
CERTIFICATE OF CORRECTION

PATENT NO. : 7,630,385 B2
APPLICATION NO. : 11/462669
DATED : December 8, 2009
INVENTOR(S) : Oyadomari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 426 days.

Signed and Sealed this

Second Day of November, 2010

David J. Kappos
*Director of the United States Patent and Trademark Office*